Jan. 24, 1961   R. COLOMBO   2,968,836
SCREW PRESS FOR EXTRUDING PLASTIC MATERIALS
Filed Nov. 4, 1958   2 Sheets-Sheet 1

Jan. 24, 1961  R. COLOMBO  2,968,836
SCREW PRESS FOR EXTRUDING PLASTIC MATERIALS
Filed Nov. 4, 1958  2 Sheets-Sheet 2

United States Patent Office 2,968,836
Patented Jan. 24, 1961

2,968,836
SCREW PRESS FOR EXTRUDING PLASTIC MATERIALS

Roberto Colombo, Turin, Italy, assignor to S.A.S. Lavorazione Materie Plastiche (L.M.P.) di M. I. Colombo & C., Turin, Italy Filed Nov. 4, 1958, Ser. No. 771,785

Claims priority, application Italy Nov. 14, 1957

2 Claims. (Cl. 18—12)

Screw presses for extruding thermoplastic materials generally comprise a casing enclosing one or more screws rotating either in the same or contrary directions. The casing is mostly heated electrically or by other means and the screws may be internally cooled.

The screw or screws are adapted to convey the material loaded at the inlet opening to the extrusion port, the material being melted and mixed as it travels from the inlet opening to the extrusion port. Since the material charged at the inlet port considerably differs in apparent specific weight from the material issuing from the extrusion port, a compression ratio obviously is required between the start of the screw or screws and the outlet. This ratio normally amounts to 1:4 to 1:6, the length of the screw or screws being such as to afford a satisfactory melting of the material travelling through the press. Both, with one or a plurality of screws in the press, the compression ratio is the same. Consequently, whenever the nature of the material changes, the screw or screws should be replaced in order to convey to the extrusion port a compact mass free of impulses due to an uneven load. Feeding material in powder or granulated form to the press implies a considerable difference so that, though high compression ratios are employed, the material reaching the extrusion port is sometimes unsatisfactory, in that it is not compact, thoroughly melted and deprived of discontinuities in delivery.

Moreover, thorough mixing of the various materials charged at the inlet always meets with considerable difficulties in machines with both, one screw only or a plurality of screws, for variation in the nature of the materials may entail differing operational conditions of the machine. By way of example, with certain thermoplastic resins a powerful pressure of the material between the screw or screws and the respective casing is immaterial or is even artificially increased in order to accelerate the melting process of the material. However, this is impossible with certain other types of material, for an excessive friction might lead to a rapid decomposition of the material treated.

Moreover, the friction which should be generated to melt the material requires high power from the plant and may lead to disturbances of the driving components through the high power involved. This difficulty is partly obviated by multiple-screw machines, in which the melting heat for the material is almost exclusively supplied in the form of external heat generated in the casing enclosing the screws, instead of largely relying on the friction which may be undergone by the material between the screws and casing. However, the above-mentioned disturbance is serious enough even in multiple-screw machines.

The improved apparatus fully obviates the above-mentioned difficulties. Its peculiar construction makes treatment of materials of any apparent specific weight by the apparatus possible. Moreover, suitable adjustment of the driving components of the apparatus affords thoroughly even extrusion and satisfactorily constant delivery. The apparatus includes a mixing compartment such that melting of the material is gradually increased to an optimum value, the extrusion capacity being fully safeguarded and reaching very considerable figures. Any cause of friction is eliminated thereby fully avoiding overheating. Finally a suction by vacuum may be provided at any region of the machine in order to remove any gases of vapours evolved on the mixing step of the material being treated.

Figure 1:
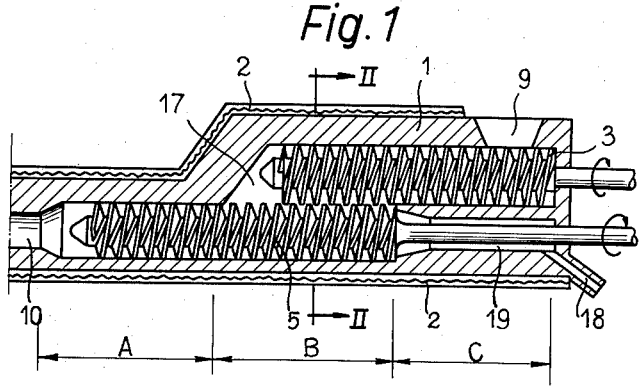
Figure 1 is a longitudinal sectional view of an embodiment of the improved apparatus.
Figure 2:
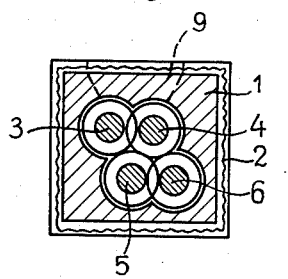
Figure 2 is a cross-sectional view thereof on line II—II.

The apparatus shown in Figures 1 and 2 comprises a casing 1 suitably heated by heating means 2 and enclosing two screw pairs, 3, 4 and 5, 6. The screws of each pair, such as 3—4, 5—6, interengage, the screws 3 and 4 of one pair being tangential to the screws 5 and 6 of the other pair. As will be seen in Figure 1 the first mentioned screw pair 3, 4 and at an intermediate point of the screws 5, 6, the latter starting at an intermediate point of screws 3, 4, so that the apparatus may be virtually subdivided into three compartments A–B–C. In compartment C the material charged at the inlet 9 is conveyed by the screw pair 3, 4 within the casing till it reaches the compartment B at which the screws 3, 4 are tangential to the screws 5, 6. The material conveyed by the screws 3, 4 is therefore fed and compressed both to the transfer chamber 17 and between the screws 3, 4 and 5, 6. The compartment A includes merely the screw pair 5, 6, which convey the material from the chamber 17 and screws 3, 4 to the end chamber 10, whence the material reaches the extrusion port. The rotational speed of the screws 3, 4 and 5, 6 can be adjusted to cause the material charged at 9 to reach the screws 5, 6 with a sufficient compression ratio for the threads of the screws 5, 6 to be totally filled with material, thereby safely affording continuity in operation of the apparatus.

When treating a material having a low apparent specific weight the screws 3, 4, exceed in speed screws 5, 6, and for a high specific weight material the screws 5 and 6 exceed in speed screws 3 and 4. The same result may obviously be attained by changing the pitch of screws 3, 4 and 5, 6 instead of the speed. The material charged at 9 is heated as it travels through compartment C to a temperature such that any moisture therein contained or any volatile substances still in the mixture of the various raw stuffs may conveniently be drawn away through the conduit 18 extending from the chamber 19 behind the screws 5, 6. The material is therefore thoroughly mixed in the compartment B, in which the screw pairs contact tangentially, reaching the compartment A totally free from any moisture or volatile substance. The screws 3, 4 may interengage and rotate in equal directions or they may be interengaging and counterrotating, the same applying to screws 5, 6; alternatively the screws 3, 4 may be right-handed, the screws 5, 6 being left-handed, or vice versa. Moreover, the pitches of the screws 3, 4 may conveniently decrease from the inlet 9 so as to slightly pre-compress the material before the latter reaches compartment B, in which the material is thoroughly mixed. Obviously, in the apparatus described above the material is intermixed through breakage of various layers on travelling from the screws 3, 4 to the screws 5, 6, for no sufficient friction force for this purpose prevails between the material and walls confining it in the casing 1. It will be sufficient to adjust the rate of rotation of screws 3, 4 and 5, 6 to make sure that the material charged at 9 is conveyed to the screws 5, 6 and totally fill the latter.

The rate of speed of the screws 3, 4 may in certain cases be insufficient to satisfactorily compress the material. According to the embodiment shown in Figure 3 the apparatus is completed by a third pair of interengaging screws 7, 8. The apparatus then operates as follows. The screws 3, 4 convey a given quantity of material to the compartment B', in which the screws 3, 4 are tangential to the screws 5, 6 rotating at different speed than screws 3, 4. The still interengaging screws 5, 6 convey the material to the compartment A' in which the screws 5, 6 are tangential to the third screw pair 7, 8, the latter screws interengaging and rotating at different speed than screws 5, 6 and 3, 4, respectively. The material charged at 16 travels from the first screw pair 3, 4 to the screw pair 5, 6, then to the screw pair 7, 8, ultimately reaching the chamber 10, whence it is conveyed to the extrusion port. At the screws 5, 6 more particularly at the rear of the latter a conduit 13 extending from chamber 12 is conveniently adapted to remove any moisture or volatile substances evolved from the material on its first travel at its softening temperature. Similarly, at the rear of the interengaging screw pair 7, 8 a conduit 15 extends from the chamber 14 and is adapted to further remove any volatile products further generated in the material having travelled through the screws 5, 6. The same considerations set out above in connection with the first embodiment obviously apply to screws 3, 4, 5, 6, 7, 8. The latter screws may all be right-handed or all left-handed or part right-handed and left-handed, respectively. Moreover, the screws 3, 4 may be of different pitch than the screws 5, 6 and 7, 8, or any other useful arrangement may be selected on construction. Obviously, in this embodiment the speed of the screws 3, 4 may be other than the speed of screws 5, 6, and the speed of the screws 7, 8 may be varied so as to afford three differential rates of speed of the three screw pairs.

Figure 5:
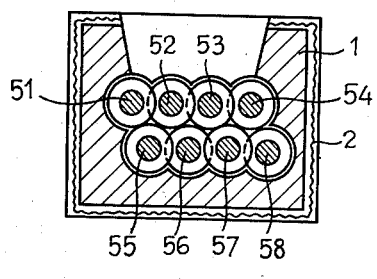
Figures 5, 6 and 7 are cross-sectional views of further three embodiments.
Figure 6:
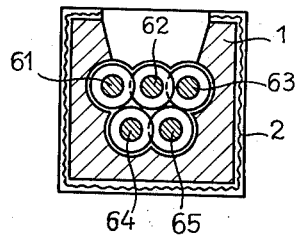
Figure 7:
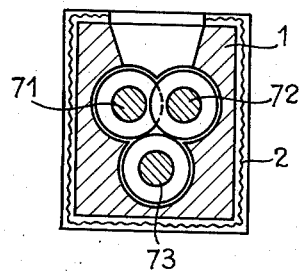

Figure 5 shows a modification in construction of the apparatus providing more than two interengaging screw pairs; more particularly two sets are provided each including four interengaging screws 51, 52, 53, 54 and 55, 56, 57, 58, respectively, the two sets being tangential to each other at the intermediate compartment. Alternatively, as shown in Figure 6, the apparatus may comprise two tangential sets of interengaging screws 61, 62, 63 and 64, 65, respectively. According to Figure 7, the top set comprises two interengaging screws 71, 72, the lower set comprising one screw only 73, tangential to screws 71, 72.

It should be noted that in all embodiments shown the screws fed from the inlet opening are at least equal in number to the immediately following screws. It should moreover be noted that the apparatus actually absorbs a cascade of alternate compression and mixing steps. So, for instance, in Figure 1, the compression step C effected by screws 3, 4 is followed by the mixing step B, effected through cooperation of the screws 3, 4 and 5, 6, whence the material reaches the second compression step A at which it is compressed by the screws 5, 6. Any volatile products are steadily removed from the mixing step at which such products separate relatively easily from the mass of the material. Obviously, a certain rate of mixing is effected at the compression steps, A, C, just as a certain increment in compression ratio is effected at the mixing step B.

Figure 4:
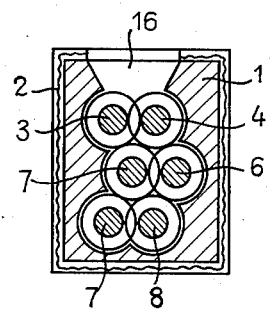
Figure 4 is a cross-sectional view on line IV—IV of Figure 3.
Figure 3:
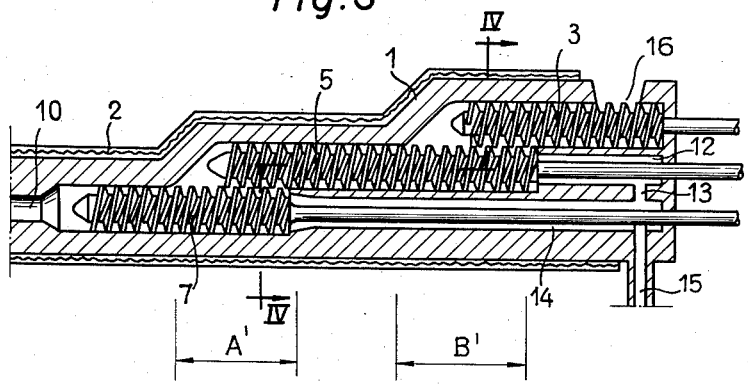
Figure 3 is a longitudinal cross-sectional view of another embodiment.

Considering now the possibility of adjusting at will the rate of speed of the individual screw sets, such as 3, 4; 5, 6; 7, 8 in the apparatus shown in Figures 3 and 4, it will be easily understood that the improved apparatus affords evenness in extrusion at any outlet pressure and with any material, avoiding thus occlusions in the material as well as accidental variations in delivery. For the extrusion rate mainly depends upon the speed of the screw set feeding the outlet chamber 10, that is, screws 5, 6 in Figures 1 and 2, and screws 7, 8 in Figures 3, 4. According to such speed, the speeds of the preceding stages may be individually adjusted to afford the desired pressures, mixing actions and removal of gaseous products, which may be easily experimentally determined. It will therefore be obvious that this apparatus can be universally used, without taking any heed of the properties or chemical composition of the raw stuff, or necessitating substitution of a type of screws specially selected for the material to be extruded, for the screws in the apparatus.

It will be understood that this invention is not limited to the embodiments shown and described and a large number of modifications may be made without departing from the scope thereof as defined by the appended claims.

What I claim is:

1. A screw press for extruding a homogeneous mass of thermoplastic materials having different characteristics comprising; a rigid casing having a feed inlet at its rear end and an extrusion outlet at its front other end, a pair of parallel screws mounted in said casing adjacent the feed inlet for rotation about their respective parallel center axes in a direction to carry material from the rear to the front end of said casing, said pair of screws being mounted side by side with their screw threads engaged to compress and thereby break-up, heat and intermix said thermoplastic materials introduced in said feed inlet, a third screw mounted for rotation in said casing parallel to, and partially forward of, said pair of screws, said third screw having a front section adjacent said extrusion outlet and a rear section overlapping the front sections of said pair of screws with the screw threads of said third screw simultaneously tangent to the screw threads of the overlapped sections of the pair of screws, said overlapping sections providing an area for simultaneously increasing said intermixing and decreasing said compression thereby discontinuing the compressive heating to prevent overheating, evenly distribute the prior heat of compression, homogenize the materials and release gas and vapors formed by the prior heating of said materials, and means for removing said released gas and vapors from said decompression region.

2. In a screw press as described in claim 1 characterized in that said means for removing gas and vapor from said decompression and turbulence producing region comprises a space defined by the casing axially behind the threads of said third screw for collecting said gas and vapors, and pipe connections on the casing for applying a suction to said space for removing gas and vapors therefrom.

References Cited in the file of this patent

UNITED STATES PATENTS

| | | |
|---|---|---|
| 2,441,222 | Fuller | May 11, 1948 |
| 2,458,068 | Fuller | Jan. 4, 1949 |
| 2,508,495 | Consalvo | May 23, 1950 |